United States Patent [19]
Llodra, Jr. et al.

[11] Patent Number: 6,041,769
[45] Date of Patent: Mar. 28, 2000

[54] PORTABLE BRICK OVEN

[76] Inventors: Joseph A. Llodra, Jr., 212 Park Pl.;
Henry A. Tinari, 210 Park Pl., both of Jupiter, Fla. 33458

[21] Appl. No.: 09/349,169

[22] Filed: Jul. 9, 1999

[51] Int. Cl.⁷ .............................. A47J 37/00; F24C 3/00
[52] U.S. Cl. ...................... 126/41 R; 126/8; 126/273 R; 126/197
[58] Field of Search .................... 126/8, 273 R, 126/273.5, 19 R, 1 D, 1 R, 190, 191, 197, 12, 13, 276; 432/249, 194; 99/467, 482, 352; 292/120, 218

[56] References Cited

U.S. PATENT DOCUMENTS

| | | | |
|---|---|---|---|
| 2,859,744 | 11/1958 | Hadley | 126/197 |
| 4,082,077 | 4/1978 | Marfatia et al. | 126/197 |
| 4,095,586 | 6/1978 | Selva | 126/273 R |
| 4,108,138 | 8/1978 | Petin | 126/19 R |
| 4,474,165 | 10/1984 | Richardson | 126/19 R |
| 4,850,332 | 7/1989 | Sivonen | 126/8 |
| 5,605,092 | 2/1997 | Riccio | 126/273.5 |

*Primary Examiner*—James C. Yeung
*Attorney, Agent, or Firm*—Norman Friedland

[57] ABSTRACT

A portable brick oven is made with a sealed brick lining for the back, opposing side and top walls with a door mounted in the front and bottom bricks defining the cooking chamber. The bottom bricks are not sealed and are aligned to define a flat baking surface and these bricks are located so that the edges of the baking surface are spaced from the back and opposing side walls and the individual bricks are not sealed so that the flame of the burner is capable of flowing between bricks. This arrangement provides, radiant, convective and conduction heating. The brick oven is modular constructed and fits into a chassis mounted on wheels. The door is uniquely hinged and clasped to allow for the ease of access into and out of the brick oven.

14 Claims, 4 Drawing Sheets

PORTABLE BRICK OVEN

TECHNICAL FIELD

This invention relates to portable outdoor grills and particularly to a portable outdoor brick oven that is designed to bake pizza pies and the like.

BACKGROUND OF THE INVENTION

As is well known to those skilled in the culinary profession, pizza pies are customarily cooked in commercial ovens specifically designed to bake this type of pie. Basically, there are two types of ovens that are specifically designed to bake pizza pies, one is a conventional metal oven and two is the stone or brick oven both of which may be fired either by electric, wood, coal, gas or the combination thereof. To certain consumers and the gourmet connoisseur diners, the brick oven is the preferred and perhaps, the only way in which a satisfactorily pizza pie, strombolli, calzone, etc. can be baked. This is not to say that the ordinary oven or oven-toaster cannot be utilized to bake a pizza pie or make the bake other baked goods. To this end, this invention is only concerned with the brick or stone type of oven and particularly, to an oven that is portable in the same sense that an outdoor or barbeque grill is portable. Of course, one would understand that even though the oven is of the outdoor grill type, this does not preclude the use of such an oven as a vendor type of oven where the owner would be in the business of selling pizza or providing pizza at a party or the like. It is believed that currently there are no portable brick ovens that are specifically designed to bake pizza pies, although there are no limitations as to what can be baked therein. One of the problems that is universal in brick types of ovens is that in order to obtain a satisfactory product, it is necessary to provide a constant heat to the oven otherwise the texture, taste and aesthetics of the product is adversely affected. To overcome this problem some of the ovens are designed to include a second source of heat or the shape of the oven is optimized to avoid loss of heat that would occur by air currents impacting the area being heated when the oven door is opened. Another important consideration in the oven is the time required to bake the product. As is known to those skilled in this technology, it requires a considerable amount of time, reasonably speaking, to bake a pizza and typically twenty minutes for the standard size pizza is considered the norm. While this invention is unique in that it is a portable brick oven, it also obviates the problems noted in the immediately above paragraphs.

Examples of brick ovens are disclosed in U.S. Pat. No. 5,413,033 entitled "Oven With A Stone Covered Bottom" granted on May 9, 1995 to Riccio and U.S. Pat. No. 5,605,092 entitled "Oven With Stone Covered Bottom And Supplemental Heater" granted on Feb. 25, 1997 to Ricco. The ovens disclosed in these two patents are commercial and are concerned with increasing productivity of the oven by providing more than one access into the oven and the problem of cooling the stones when air passes thereover when the access doors to the oven are opened. U.S. Pat. No. 5,031,602 entitled "Convertible Portable Cooking Apparatus" granted to Vick on Jul. 16, 1991 exemplifies a portable type grill that is convertible to an oven but is not of the brick type that is contemplated by this invention.

This invention contemplates a portable oven that is made from bricks and is adapted to be fired by a typical 20 pound propane tank of the type that is generally used in residential outdoor grills. The bricks are judicially arranged so that the oven will provide convection, radiation and conduction modes of heating and unlike the commercial ovens that typically require twenty minutes or more to bake an ordinary sized pizza, the oven of this invention reduces the baking time considerably.

SUMMARY OF THE INVENTION

An object of this invention is to provide an outdoor brick oven that is characterized as being sufficiently portable so as to be capable of easy mobility, is designed in a modular construction so that the oven is removable with all of the major components being held in tact so as to be utilized in another location and is relatively inexpensive to fabricate and maintain. The oven is gas fired and does not require a second source of heat and the fire box can be any commercially available fire box that is fueled by a typical twenty pound propane tank or by natural gas. The oven is capable of producing radiant, convection and conduction heat so as to produce a satisfactory pizza pie of ordinary size in substantially seven minutes.

A feature of this invention is the judicious arrangement of the bricks so that the bottom bricks forming the baking surface of the brick oven are arranged to provide spaces between adjacent bricks to allow the flame to migrate toward the top baking surface to provide radiant and conductive heating and to provide spacing at the side edges to allow the heat to access into the oven adjacent the side walls of the oven to provide convection and radiant heating.

The foregoing and other features of the present invention will become more apparent from the following description and accompanying drawings.

DETAILED DESCRIPTION OF THE INVENTION

Figure 1:
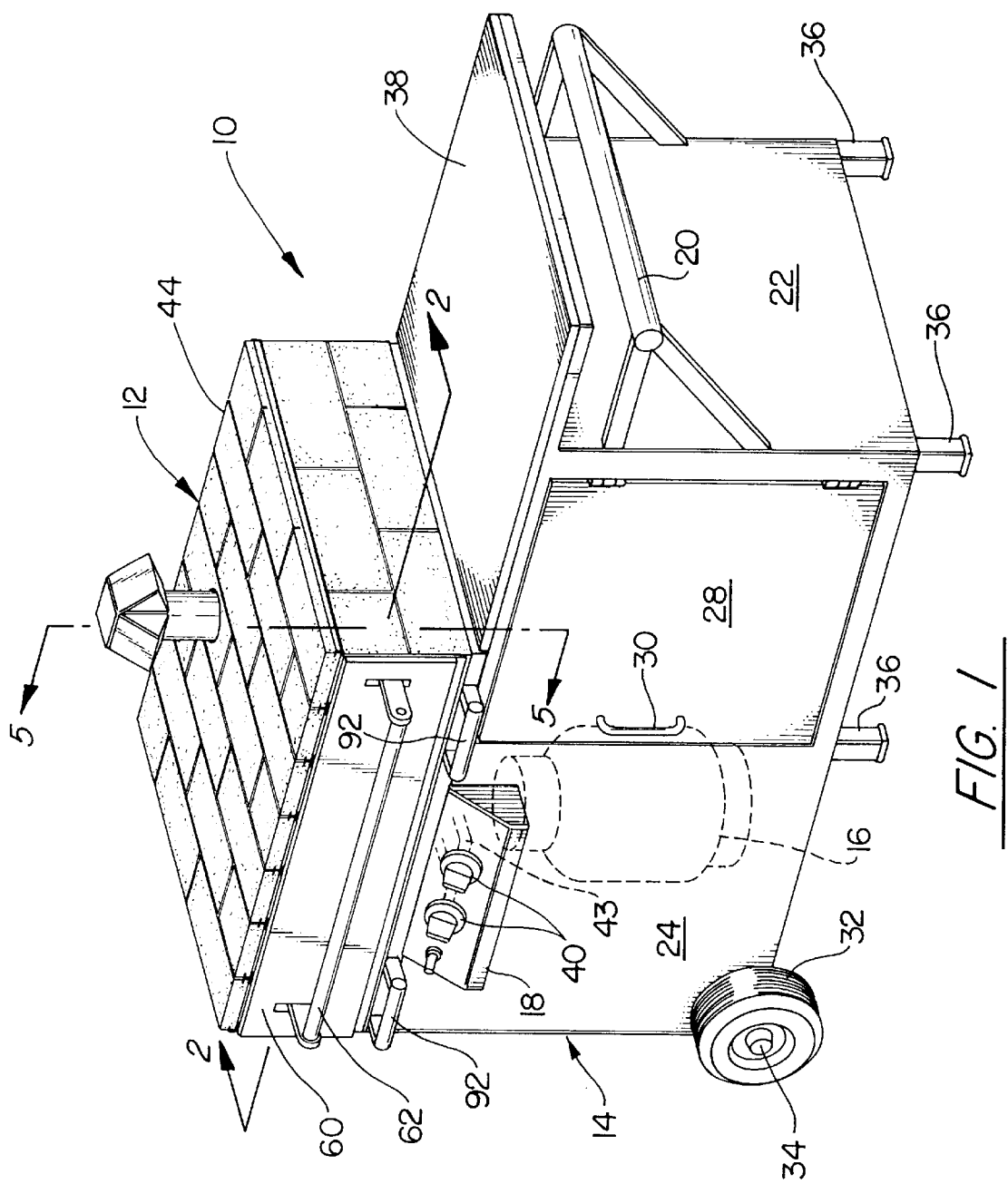
FIG. 1 is a perspective view of the portable gas fired brick oven of this invention.

While this invention is described in its preferred embodiment as a portable brick oven and the fact that the brick oven is made into a portable product that has a niche in the market place, as one skilled in this art will appreciate, the scope of this invention doesn't preclude the possibility that the oven portion of the portable brick oven assembly can be located in a more permanent residence, say, the kitchen of a residential home or the like. Needless to say, that when used as a portable baking oven and being utilized in the outdoors it would require certain components that would otherwise need to be changed if used in the indoors. For example, the flue or chimney may take a different design since it may not be desirable to exhaust in the indoors. These changes are deemed to be minor in nature and would be obvious to one of ordinary skill.

For a better understanding of this invention reference will be made to FIGS. 1–5 which disclose the portable brick oven assembly generally illustrated by reference numeral 10 as being comprised of the brick oven generally illustrated by reference numeral 12 supported on the chassis generally illustrated by reference numeral 14. The brick oven 12 and chassis 14 are modular and constructed so that the brick oven can be removed together with the burner so that it could be utilized in a different location merely by adding the controls 40 and fuel source 16. As will be apparent to those skilled in this art various forms of controls, various types of fuel and various burners can be utilized with this invention without departing from the scope thereof.

The chassis 14 may take any suitable form to house the fuel tank 16, the control panel 18 and is configured in a cabinet configuration. The chassis 14 is framed in a box-like construction with the use of commercially available square tubular carbon steel or stainless steel stock. It may include handle 20 supported to the frame. The opposite side panels 22 (one being shown) and front panel 24 are made from sheet metal, also preferably carbon steel, stainless steel or other light weight material and are suitably attached to the frame in a well known manner. The details of construction are omitted herefrom for the sake of simplicity and convenience since the primary purpose of the chassis is to support the oven so that it will be portable and could be used as a work station. In this configuration, the chassis defines a cabinet and may include a door 28 with its own handle 30 hingedly connected to the frame to gain access therein. A pair of wheels 32 (only one being shown) are suitably mounted on an axle 34 supported to the frame and legs 36, which are extensions of the frame portion. The chassis assembly defines a cart in a wheel-barrel configuration for ease of movement. A top panel 38 that serves as a working surface may likewise be included.

In order to achieve the modular construction, the frame of the chassis 14 includes the frame members 15 (FIG. 2) which are formed from square tubing and define a cavity 17 for defining the fire well for receiving the burner assembly 36. The side elements of extension frame 93 of the brick oven 12 extending into cavity 17 are contiguous with the frame members 15 and fit therebetween and are supported by the rectangularly shaped frame 19 affixed to extension frame 93 that rests on the top of the frame members 15.

The burner assembly includes a commercially available burner(s) 36 suitably supported by base pan 38 which is attached to the tubular member 93 of the extension frame of the brick oven 12 and includes the typical Venturi fittings 41 for interconnecting the burner control valve jets 43 (FIG. 1) of the burner control 40 to the source of fuel contained in the replaceable tank 16. Burner 36 in this disclosure is a single burner unit with a controllable left side and a controllable right side heating portions which are controlled by the two individual burner control knobs. Obviously, as one skilled in this art will appreciate any well known commercially available burners could be utilized without departing from the scope of this invention.

As is apparent from the foregoing the chassis 14 serves to support the fuel tank and controls while the fire well and burner form a part of the brick oven configuration. The chassis design and configuration is not critical to the invention since the invention relates primarily to the brick oven. Obviously, the chassis must be made portable so that the brick oven is a portable unit.

The brick oven 12 is configured into a rectangularly shaped box having a top 44 wall, bottom 46 which serves as the baking surface, opposing side walls 48, and back wall 50 (details are omitted from FIG. 2 for clarity purposes) all constructed with commercially available fire bricks 52. The front is opened as it is the access into the baking chamber.

A frame 53 configured in the shape of a rectangular box supports a plurality of C-shaped channels as will be described herein below. As mentioned above the brick oven 12 is framed in a box like construction fabricated from commercially available square carbon steel or stainless steel tubes 54 that are attached in a well known manner, say by welding.

The next portion of this description deals primarily with the construction of the top 44, opposing side walls 48 and back wall 50 since these are similarly constructed and the bottom wall will be described separately herein below. Frame 53 carries a matrix of C-shaped channels 56 suitably attached to the frame, say be welding that extend along the top, opposing sides and back of the frame and are parallely disposed and serve to support the bricks 52. Bricks 52 are formed with straight through grooves on the edges thereof that slide onto the channels on the C-shaped channel members 56 in a tongue and groove fit fashion and are mounted to form the top, back and opposing side walls of the cooking portion of the brick oven. The space between adjacent bricks is sealed with a commercially available fire brick cement to join the adjacent bricks to hold them in place and seal the cooking chamber formed thereby. A steel reinforcing commercially available diamond mesh 70 may be disposed between the frame and underside of the top wall 44 to add to the structural integrity of the brick oven. This steel mesh together with the tongue and groove fittings form a rigid and secure oven that is designed to tolerate the type of handling that it would encounter in an outdoor environment and used by the ordinary household resident.

A chimney or flue 58 is mounted on the top wall in a well known manner and serves to vent the cooking chamber.

A suitable hinged door 60 (FIGS. 1 & 5) is mounted on the front opening to axle 63 for completely sealing the cooking compartment when closed and for gaining access to the cooking chamber when opened. A handle 62 is mounted on the front of the door 60 and is supported by a pair of latch members 64 pivotally mounted on the trunnion 66 on the opposing side edges of the door 60. A detent 68 is formed at the end of the latch members and serve to engage the post 69 extending into the cooking chamber from the opposing side walls 48. When the door is opened the latch members 64 make an arcuate path and disengage the detent 68 from the post to allow the door to open to its full opened position. When the door is moved to the close position the latch members 64 move in exactly the reverse directions to reengage the detent, clasp and secure the door tightly to avoid the loss of heat and to prevent the door from inadvertently open.

Figure 2:
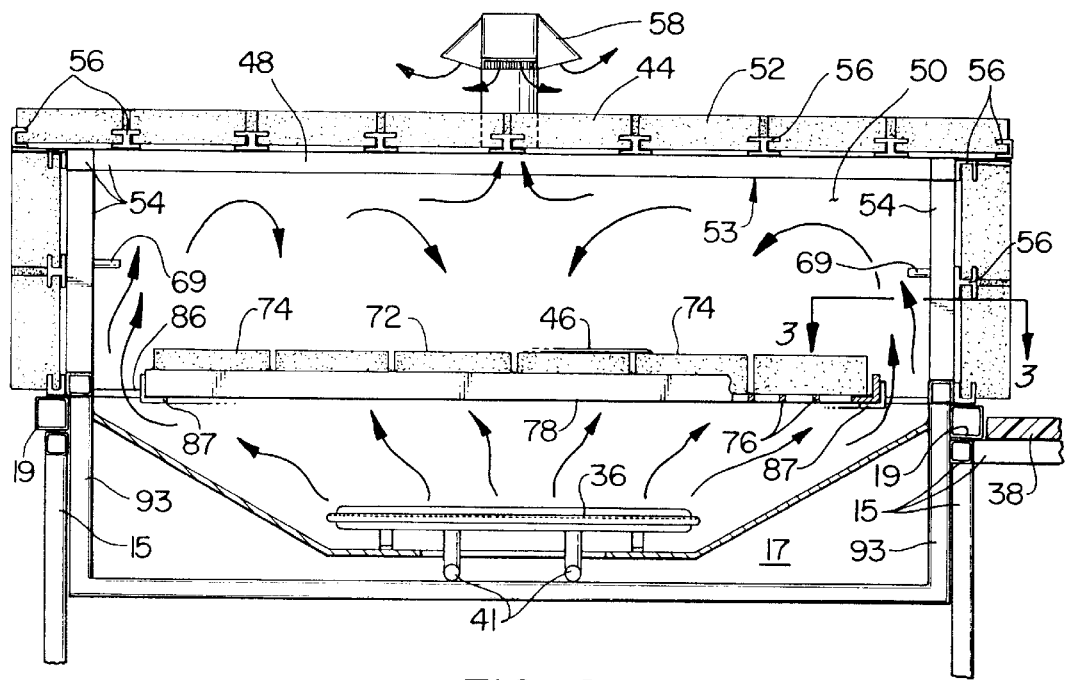
FIG. 2 is a fragmentary sectional view taken along lines 2—2 of FIG. 1 and illustrates the details of this invention.
Figure 3:
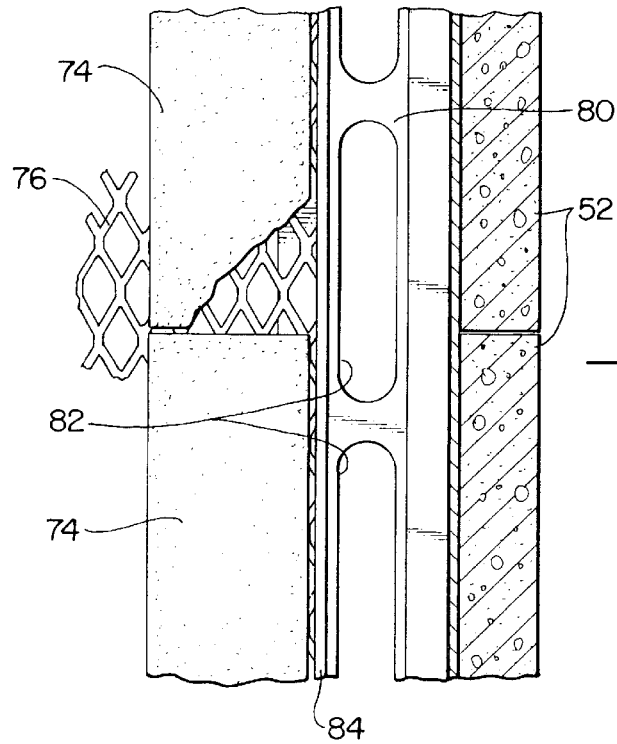
FIG. 3 is a fragmentary sectional view taken along lines 3—3 of FIG. 2.
Figure 4:
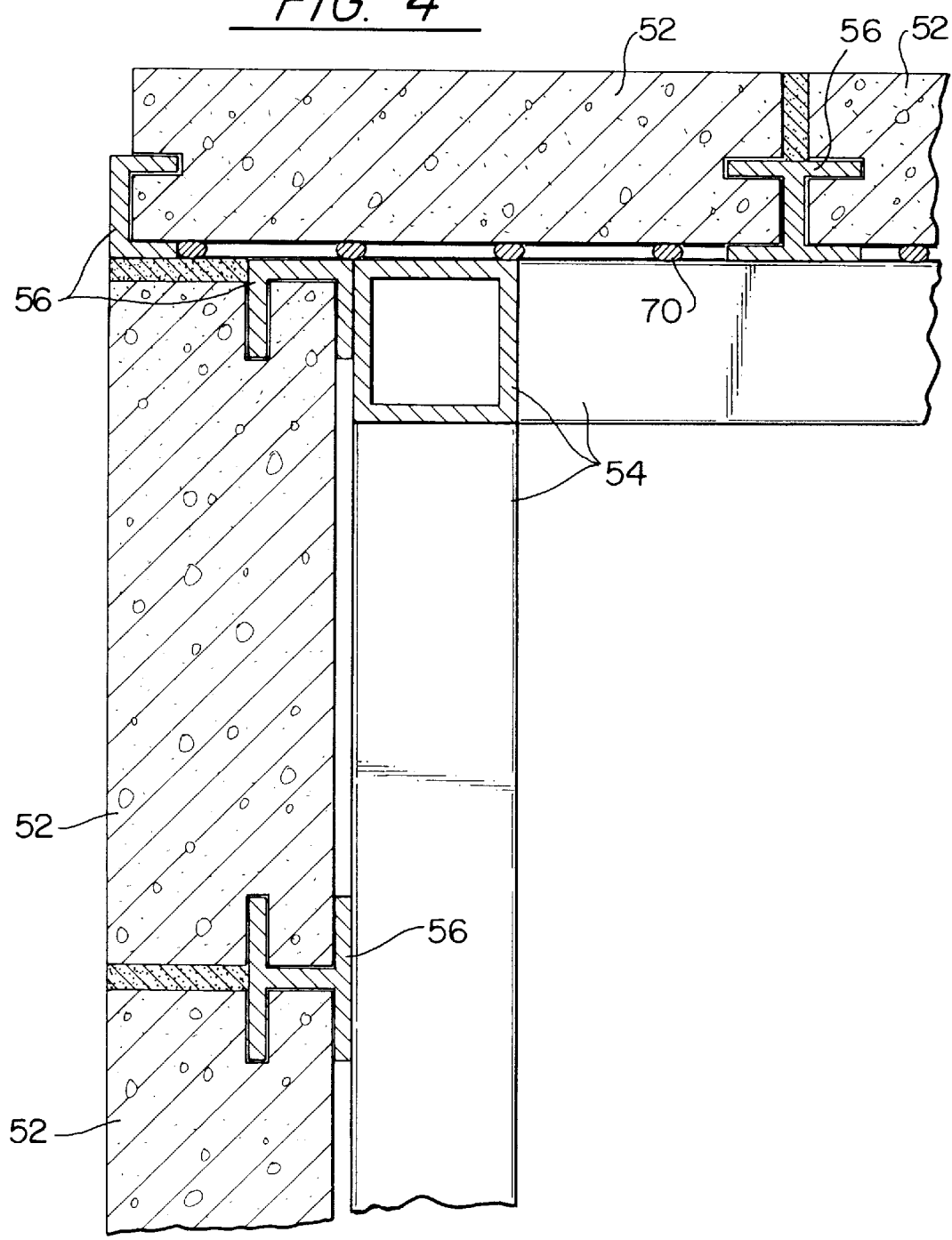
FIG. 4 is a fragmentary enlarged view showing the details of the top left corner of the cooking chamber of FIG. 2.
Figure 5:
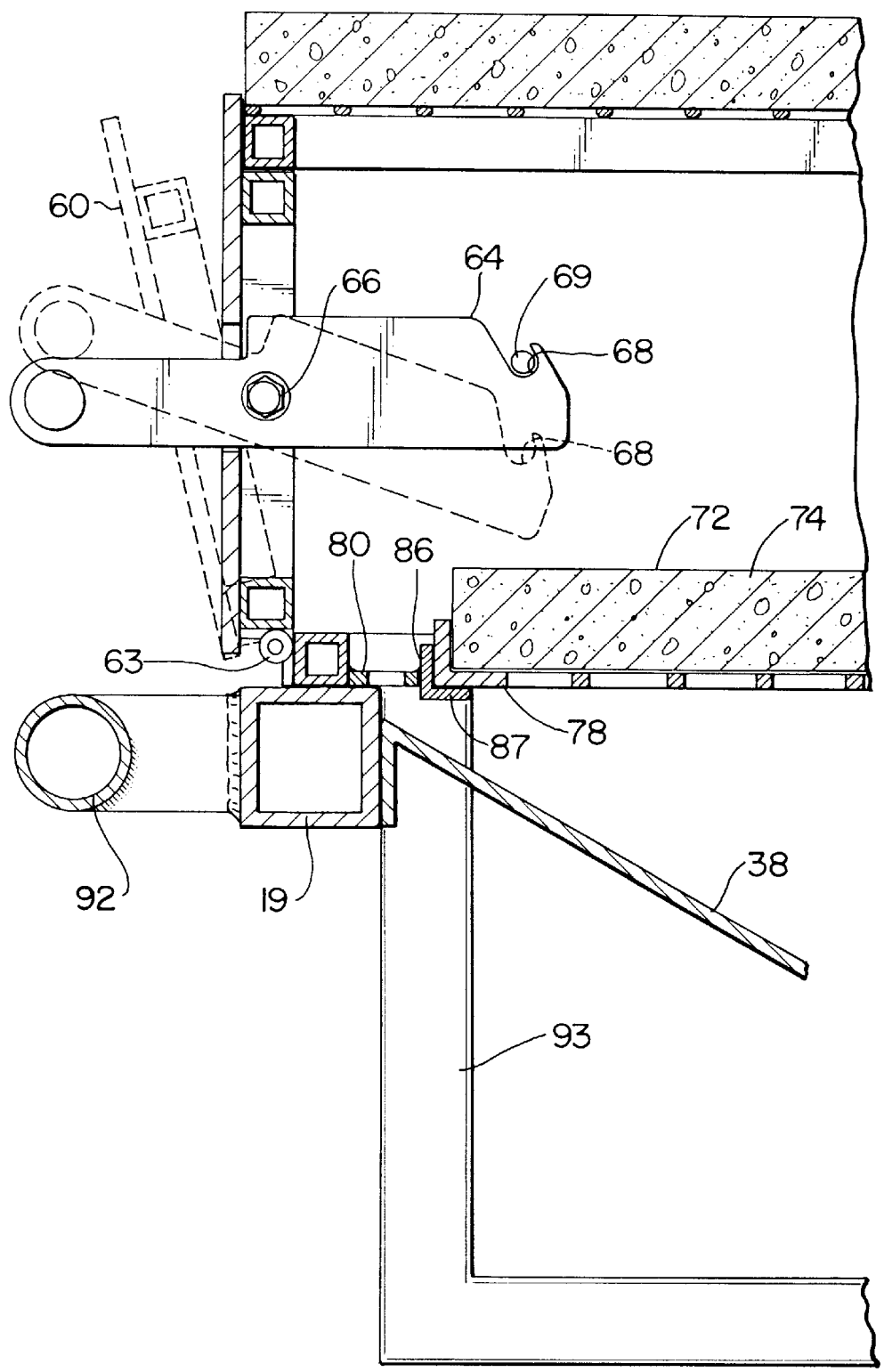
FIG. 5 is a fragmentary sectional view taken along lines 5—5 of FIG. 1 and illustrates the door of the baking oven depicted in FIG. 1.

The next portion of the description as best seen in FIGS. 2, 3 & 5 will detail the cooking surface and construction thereof. The cooking surface 72 is formed from of a plurality of bricks 74 fabricated without the groove that are freely aligned over a steel mesh 76 made similarly to the steel mesh 70. The steel mesh is welded into a frame 78 made from steel angle irons that are formed in a rectangular configuration that is substantially smaller than the frame 53 of the brick oven 14. The purpose of the smaller frame 78 is to leave a space between the cooking surface 72 and the opposing side walls, the back wall and front of the interior of the brick oven 12. This space is critical in the design so as to allow the convective heat from the burner to flow to the opposing side walls, the back wall and front and encompass the entire space of the cooking chamber. This arrangement contributes significantly to the shorter baking time required. The frame 78 supporting bricks 74 are slidably supported to the baffle plate 80. Baffle plate 80 is made from stainless steel and is configured into a rectangularly shaped rim surrounding the cooking surface and is generally a flat, planar configuration that includes a plurality of spaced apertures 82 (FIG. 3) for permitting the heat to rise to the interior of the brick oven 14. The perimeter defined by the inner edge 84 of the baffle plate 80 is secured to the frame 53, say by welding. Angle iron braces 87 are attached to the opposing side edges 86 of the baffle plate 80 and serves as a parallel ledges or guides to support the cooking assembly. It is apparent from the foregoing that the elements forming cooking surface assembly is made as a shelf that easily slides along the ledges so as to be removed for cleaning or maintenance purposes.

It is also critical in the design of the cooking surface that each of the single layer of bricks forming the cooking surface lie freely and is spaced relative to each other to form a gap. The dimension of this space may be dictated merely by the tolerances of the bricks themselves to define so long as the gap between bricks is relatively small. Obviously the size of the frame is larger than the bricks when assembled which dictates the dimension of the space between bricks. This design assures that the flame from the burner which heats the bricks also migrates toward these spaces and while not necessarily protruding past the space itself the heat generated by the flame is allowed to pass between the bricks which like the baffle plate described above also enhances the cooking time required.

As shown in FIG. 1 handles 92 may be mounted on the front of the brick oven and are supported to the frame thereof, say by welding, (similar handles are mounted on the back of the brick oven and are not shown) for removing or inserting the brick oven assembly 12 from or into the chassis 14.

An efficacious brick oven that has been built and successfully tested has been fabricated utilizing a brick oven frame made from one (1) inch tube steel, one (1) inch steel C-channels supporting two (2) bricks high by two and a quarter (2.25) inches thick by two and a half (2.5) bricks long for opposing sides, two (2) bricks high by two and a quarter (2.25) inches thick by four and a quarter (4.25) bricks long and ten (10) bricks wide by one and a quarter (1.25) inches thick by two and a half (2.5) bricks deep.

Although this invention has been shown and described with respect to detailed embodiments thereof, it will be appreciated and understood by those skilled in the art that various changes in form and detail thereof may be made without departing from the spirit and scope of the claimed invention.

We claim:

1. A portable brick oven including a top wall, a bottom wall, a back wall and opposing side walls defining a cooking chamber with the front being opened, a door mounted on said front for opening and closing said cooking chamber, said back wall, said opposing side walls and said top wall being made from individual bricks having sealing compound disposed between bricks for defining a enclosed compartment, said bottom wall being formed from spaced bricks horizontally aligned to define a baking surface, a burner spaced beneath said bottom wall for heating said bricks, the bottom wall extending toward but spaced from said back wall and said opposing side wall for permitting the heat to rise through the gap formed thereby to provide, convection heating to the item being baked.

2. A portable brick oven as claimed in claim 1 wherein the cooking chamber is receiving heat by conduction, radiation and convection.

3. A portable brick oven as claimed in claim 2 including a chassis having at least two wheels mounted on the forward end supporting said brick oven for portability thereof, said chassis and said brick oven being modular constructed.

4. A portable brick oven as claimed in claim 3 including a frame formed from a plurality of spaced C-shaped channel members defining substantially rectangularly-shaped box for supporting the bricks in said back wall, said opposing side walls, and said top wall.

5. A portable brick oven as claimed in claim 4 including an additional frame slidably connected to said frame for defining a shelf that is removable from said cooking chamber, said bricks defining said baking surface being mounted on said additional frame and movable therewith so as to be removed from said cooking chamber and said bricks defining said bottom wall being freely mounted thereon to define gaps between adjacent bricks.

6. A portable brick oven as claimed in claim 4 wherein said C-shaped channel members are made from a metallic material.

7. A portable brick oven as claimed in claim 4 including a vent extending through said top wall for venting the cooking chamber to ambient.

8. A portable brick oven as claimed in claim 6 including a pan affixed to said frame and parallely spaced to said bottom wall, said burner supported being supported said pan, a source of fuel connected to said burner, and control means for regulating the flow of fuel to said burner.

9. A portable brick oven for providing conductive, convective and radiant heat to the item being baked, said oven including a top wall, a bottom wall, a back wall and opposing side walls defining a cooking chamber with the front being opened, a door mounted on said front for opening and closing said cooking chamber, said back wall, said opposing side walls and said top wall being made from individual bricks having sealing compound disposed between bricks for defining a enclosed compartment, a frame formed from a plurality of spaced C-shaped channel members defining substantially a rectangularly-shaped box for supporting the bricks in said back wall, said opposing side walls, and said top wall, an additional frame slidably connected to said frame for defining a shelf that is removable from said cooking chamber, additional bricks horizontally aligned in said additional frame forming a portion of said bottom wall for defining a baking surface and being freely mounted thereon so as to define gaps between adjacent bricks, a burner spaced beneath said bottom wall for heating said bricks, the bottom wall extending toward but spaced from said back wall and said opposing side wall for permitting the heat to rise through the gap formed thereby to provide convection heating to the item being baked.

10. A portable brick oven as claimed in claim 9 including a chassis having at least two wheels mounted on the forward end supporting said brick oven for portability thereof, said chassis and said brick oven being modular constructed.

11. A portable brick oven as claimed in claim 10 including a vent extending through said top wall for venting the cooking chamber to ambient.

12. A portable brick oven as claimed in claim 11 including a pan affixed to said frame and parallely spaced to said bottom wall, said burner supported being supported said pan, a source of fuel connected to said burner, and control means for regulating the flow of fuel to said burner.

13. A portable brick oven as claimed in claim 12 including a door pivotally mounted on the front face of said oven for gaining access into said cooking surface, said door having a pair of laterally spaced latching members extending from the exterior of said door into the cooking chamber, said latching members having a detent formed thereon, a pair of opposing posts extending from each of said opposing walls into said cooking chamber and complementing said detent to fit therein when said door is in the closed position, a handle attached to one end of each of said latching members at the exterior of said door, and said latching members movable with said door to engage and disengage said detent from said post.

14. A portable oven as claimed in claim 13 including a baffle extending in said gap to fill the void between said back wall and said opposing side walls, said baffle having a plurality of apertures for allowing the heat from said burner to pass therethrough into said cooking chamber.

* * * * *